(12) United States Patent
Atkins et al.

(10) Patent No.: US 9,607,193 B2
(45) Date of Patent: *Mar. 28, 2017

(54) ENHANCED IDENTIFICATION SYSTEM

(75) Inventors: Raymond Catherall Atkins, Pretoria (ZA); Mario Alphonso Marais, Pretoria (ZA); Hendrik Van Zyl Smit, Pretoria (ZA)

(73) Assignee: ZIH Corp., Lincolnshire, IL (US)

( * ) Notice: Subject to any disclaimer, the term of this patent is extended or adjusted under 35 U.S.C. 154(b) by 2374 days.

This patent is subject to a terminal disclaimer.

(21) Appl. No.: 11/392,429

(22) Filed: Mar. 29, 2006

(65) Prior Publication Data
US 2006/0279408 A1   Dec. 14, 2006

Related U.S. Application Data

(63) Continuation of application No. 10/635,683, filed on Aug. 7, 2003, now Pat. No. 7,053,755, which is a
(Continued)

(30) Foreign Application Priority Data

May 14, 1997 (GB) .................................. 9709741.4
Nov. 14, 1997 (GB) .................................. 9724185.5

(51) Int. Cl.
*H04Q 5/22* (2006.01)
*G06K 7/10* (2006.01)
*G06K 7/00* (2006.01)

(52) U.S. Cl.
CPC ....... *G06K 7/10346* (2013.01); *G06K 7/0008* (2013.01); *G06K 7/10039* (2013.01); *G06K 7/10059* (2013.01); *G06K 7/10336* (2013.01)

(58) Field of Classification Search
CPC ............. G06K 7/10346; G06K 7/0008; G06K 7/10039; G06K 7/10059; G06K 7/10336
(Continued)

(56) References Cited

U.S. PATENT DOCUMENTS 4,691,202 A * 9/1987 Denne et al. ................. 340/10.2
5,055,659 A * 10/1991 Hendrick et al. .......... 340/10.51
(Continued)

FOREIGN PATENT DOCUMENTS

DE   19544054   5/1997
EP   0161799   11/1985
(Continued)

OTHER PUBLICATIONS

Office Action for U.S. Appl. No. 13/572,260; dated Dec. 12, 2012.
(Continued)

*Primary Examiner* — Edwin Holloway, III

(57) ABSTRACT

A method and an identification system used for communicating between a reader and a plurality of transponders are disclosed. The reader has a transmitter for transmitting a signal and each transponder includes a receiver for receiving the reader signal and a transmitter for generating a transponder signal. When the reader recognises a transponder signal from one of the transponders it immediately issues a mute instruction, muting all other active transponders and passing control to the said transponder, without the need for a specifically timed acknowledgement to the said controlling transponder. The reader may issue a single disable/wakeup instruction which disables the controlling transponder returning control to the reader and reactivated all muted (but not disabled) transponders.

6 Claims, 9 Drawing Sheets

Related U.S. Application Data continuation of application No. 09/415,234, filed on Oct. 12, 1999, now Pat. No. 6,661,336, which is a continuation of application No. PCT/GB98/01385, filed on May 14, 1998.

(58) Field of Classification Search
USPC ..... 340/10.2, 10.1, 10.3, 10.31, 10.33, 10.4, 340/10.42, 10.51, 5.61, 5.63, 568.1, 340/572.1, 10.32; 342/42, 44, 51; 700/11; 455/41.1
See application file for complete search history.

(56) References Cited

U.S. PATENT DOCUMENTS

| | | | |
|---|---|---|---|
| 5,124,699 A * | 6/1992 | Tervoert et al. | 340/10.2 |
| 5,231,273 A | 7/1993 | Caswell et al. | |
| 5,365,551 A * | 11/1994 | Snodgrass et al. | 375/141 |
| 5,406,297 A | 4/1995 | Caswell et al. | |
| 5,430,447 A * | 7/1995 | Meier | 340/10.51 |
| 5,519,381 A | 5/1996 | Marsh et al. | |
| 5,528,232 A | 6/1996 | Verma et al. | |
| 5,530,702 A | 6/1996 | Palmer et al. | |
| 5,537,105 A | 7/1996 | Marsh et al. | |
| 5,621,412 A * | 4/1997 | Sharpe et al. | 340/10.33 |
| 5,630,064 A * | 5/1997 | Ishibashi et al. | 340/10.2 |
| 5,751,570 A | 5/1998 | Stobbe et al. | |
| 5,777,561 A | 7/1998 | Chieu et al. | |
| 5,926,110 A * | 7/1999 | Downs et al. | 340/10.51 |
| 5,940,006 A | 8/1999 | MacLellan et al. | |
| 5,952,922 A * | 9/1999 | Shober | 340/572.4 |
| 5,966,083 A | 10/1999 | Marsh et al. | |
| 6,104,279 A | 8/2000 | Maletsky | |
| 6,661,336 B1 | 12/2003 | Atkins et al. | |
| 6,784,787 B1 | 8/2004 | Atkins et al. | |
| 6,812,852 B1 | 11/2004 | Cesar | |
| 7,053,755 B2 | 5/2006 | Atkins et al. | |
| 8,872,631 B2 | 10/2014 | Atkins et al. | |
| 2002/0024422 A1 | 2/2002 | Turner et al. | |
| 2008/0018431 A1 | 1/2008 | Turner et al. | |
| 2011/0163895 A1 | 7/2011 | Rado | |

FOREIGN PATENT DOCUMENTS

| | | |
|---|---|---|
| EP | 0405695 | 1/1991 |
| EP | 0467036 A2 | 1/1992 |
| EP | 0494114 A2 | 7/1992 |
| EP | 0585132 A1 | 3/1994 |
| EP | 0689151 A2 | 12/1995 |
| GB | 2116808 A | 9/1983 |
| NL | 8802718 | 6/1990 |

OTHER PUBLICATIONS

United States Patent and Trademark Office, "Notice of Allowance," issued in connection with U.S. Appl. No. 13/572,260 on Jun. 25, 2014.

International Preliminary Examination Report issued in connection with International Patent Application No. PCT/GB98/01385 completed on Jul. 16, 1999.

European Patent Office, "Summons to Attend Oral Proceedings," issued in connection with EP Patent Application No. 98921613.0 on Jan. 17, 2002.

European Patent Office, "Communication pursuant to Article 96(2) EPC," issued in connection with EP Patent Application No. 02024117.0 on Mar. 24, 2003.

\* cited by examiner

ENHANCED IDENTIFICATION SYSTEM

CROSS-REFERENCE TO RELATED APPLICATIONS

This application is a continuation of U.S. Pat. No. 7,053,755, filed Aug. 7, 2003, which is a continuation of U.S. Pat. No. 6,661,336, filed Oct. 12, 1999, which is a continuation of PCT Publication No. WO/1998/052142, filed on May 14, 1998, which is hereby incorporated herein in its entirety by reference.

FIELD OF THE INVENTION

This invention relates to a method of identifying a plurality of transponders each of which transmits data at intervals to a receiver. The invention also relates to an identification system comprising a plurality of transponders and a receiver, and to the transponders and receivers themselves. The invention further relates to method and apparatus for improving the identification systems disclosed in EP 494,114 A and EP 585,132 A.

BACKGROUND OF THE INVENTION

Identification systems are known in which a plurality of transmitters, typically transponders, are activated by a power signal (or an "interrogation signal") and then transmit reply signals, usually containing identification data, to a receiver, which typically forms part of the interrogator. The signals may be transmitted in many ways, including electromagnetic energy, e.g. radio frequency (RF), infra red (IR), and coherent light, and sound, e.g. ultrasound. For example, the transmission may be achieved by actual emission of RF energy by the transponders, or by the modulation of the reflectivity of an antenna of the transponder, resulting in varying amounts of RF energy in the interrogation signal being reflected or back-scattered from the transponder antenna.

GB 2,116,808 A discloses an identification system in which the individual transponders are programmed to retransmit data in a pseudo-random manner. Timing signals for the transponders in this identification system are derived from a crystal oscillator, thereby making the transponders expensive to manufacture.

EP 467,036 A describes another identification system which uses a pseudo-random delay between transponder data transmissions. In this example, a linear recursive sequence generator is seeded by the transponder identification address to make the pseudo-random delay as random as possible.

EP 161799 A discloses an interrogator/transponder system in which an interrogator broadcasts an interrogation signal to a plurality of transponders present in the interrogation field. Each transponder transmits a reply signal consisting of a uniquely coded identification number. The interrogator then re-transmits the signal it has received and each transponder decodes the signal and checks the data against it's own identification number. In the event that a particular transponder recognizes it 5 own code, that transponder discontinues the reply signal or adjusts to receive further instructions (all others having shut down). If interference occurs because two or more transponders are transmitting at the same time, the interrogator waits until a valid signal is received.

EP 494112 A discloses another interrogator/transponder system in which an interrogator broadcasts an interrogation signal to a plurality of transponders present in the interrogation field. One example of the identification system comprises an interrogator or reader which transmits interrogation signals at a power of approximately 15 W and at a frequency of approximately 915 MHZ to a number of passive transponders. The transponders derive a power supply from energy in the interrogation signal, and modulate a portion of the energy received from the interrogator with an identification code to generate a response signal, which is transmitted back to the interrogator.

EP 585,132 A discloses another interrogator/transponder system in which transponders are provided with local timing means which is dependent on the power supply voltage derived from the interrogation signal, thereby causing the clock frequencies of different transponders to vary relatively widely. The interrogator is adapted to detect successful reception of a response signal from any transponder and to derive a synchronisation signal from the response signal. The interrogation signal may then be modified synchronously with a particular transponder.

The transponder can use separate receiver and transmitter antennas, or a single antenna can be utilised for both reception and transmission. If a single antenna is used the response signal can be generated by modulating the reflectivity of such an antenna; if separate receiver and transmitter antennae are used then a modulator which redirects energy from the receiver antenna to the transmitter antenna is required. Alternatively, the transponder can be independently powered and may generate its own response signal.

The system described in the above mentioned patent application provides for each transponder to wait for a random or pseudo-random period after receiving an interrogation signal from the interrogator, before transmitting its own response signal. Successful identification of any transponder is indicated by a brief interruption or other modification of the interrogation signal, following closely on the successful reception of a response signal of any particular transponder. This acts as a turn-off signal to the relevant transponder. The random or pseudo-random delay in the generation of response signals, in response to repeated interrogation signals, ensures that all transponders will eventually be identified by the interrogator.

In general, if the transmissions of two transponders overlap or clash, the transmissions are polluted and therefore lost, since the receiver cannot distinguish the separate transmissions. Thus, the system must provide for each transponder to transmit repeatedly until its entire transmission takes place in a "quiet" time and is successfully received by the interrogator.

Any transponder must obtain a quiet time which is as long as the entire length of the data stream to be transmitted. As shown in FIG. 1, there is considerable wasted time in systems which employ a back-off and retry algorithm of this sort.

EP 689 151 A2 discloses another interrogator/transponder system in which the RFID tag transmit a request to transmit (RTT) signal and wait for an acknowledgement signal from the network controller before attempting to transmit data. The disadvantage with such a system is that the tag must wait for, and decode, an appropriately timed permission before attempting to transmit data, thereby adding unnecessary complexity to the tag and leading to considerable wasted time in the transmission cycle. If the tags are to have local timing means (as described in detail in EP 585,132 A) the timing and the duration of the acknowledgment instruction must be derived from the local timing means of the tag transmitting the RTT signal. Since the RTT signal must necessarily be very short in order to provide the advantages suggested, the network controller must be able to extract the timing from very little information. This adds unnecessary complexity to the network controller.

SUMMARY OF THE INVENTION

It is an object of this invention to provide an improved, yet simple, identification system with improved recognition of data signals. It is also an object of this invention to remove wasted time, to improve the speed of identifying a plurality of transponders without adding unnecessary complexity to the identification systems.

It is also an object of the present invention to provide an identification system in which wasted time due to transmission pollution is considerably reduced while still providing a reasonably fast tag transmitting cycle.

According to a first aspect of the invention, there is provided an identification system comprising a reader including a transmitter for transmitting a signal and a plurality of transponders, each transponder including a receiver for receiving the reader signal and a transmitter for generating a transponder signal, characterised in that on recognising a transponder signal from a transponder the reader immediately issues a mute instruction, muting all other active transponders and passing control to the said transponder, without the need for a specifically timed acknowledgement to the said controlling transponder.

According to a second aspect of the invention, there is provided a method of identifying a plurality of transponders comprising transmitting a reader signal, and each transponder receiving the reader signal, characterised in that on recognising a transponder signal from a transponder the reader immediately issues a mute instruction, muting all other active transponders and passing control to the said transponder, without the need for a specifically timed acknowledgement to the said controlling transponder.

In a further aspect of the invention, there is provided a transponder comprising receiver means for receiving a reader signal, transmission means for transmitting a transponder signal containing data which identifies the transponder whereby in a set of transponders, two or more transponders may transmit their transponder response signals in response to receiving the reader signal, characterised in that the transponder is provided with control means, whereby on recognising a mute instruction in the reader signal, all active transponders in the set but one are muted and control is passed to said one transponder, without the need for a specifically timed acknowledgement to the said controlling transponder.

In a yet further aspect of the invention there is provided an integrated circuit for use in a transponder, comprising receiver means for receiving a reader signal, transmission means for transmitting a transponder signal containing data which identifies the transponder whereby in a set of transponders, two or more transponders may transmit their transponder response signals in response to receiving the reader signal, characterised in that there is provided control means, whereby on recognising a mute instruction in the reader signal, all active transponders in the set but one are muted and control is passed to said one transponder, without the need for a specifically timed acknowledgement to the said controlling transponder.

In a further aspect of the invention there is provided a reader comprising transmitter means for transmitting an interrogation signal to at least one transponder, at a time when at least one other transponder may transmit in response to the interrogation signal, and receiver means for receiving a response signal from a transponder, characterised in that on recognising a transponder signal from the transponder the reader immediately issues a mute instruction, muting all other active transponders, and passing control to said transponder, without the need for a specifically timed acknowledgement to the said controlling transponder.

The mute instruction may take the form of a total or partial interruption in the reader signal, or some other modulation of the reader signal. Alternatively, the mute instruction may be a separate signal transmitted by the reader, for example at a frequency which differs from the reader signal.

An acceptance instruction may be sent after the transponder signal has been successfully received by the reader. The acceptance instruction may be of a similar nature to the mute instruction, such as a total or partial interruption or other modulation of the reader signal. Alternatively, the acceptance instruction may be transmitted at a frequency which differs from the reader signal; such a frequency may also differ from the frequency of the mute instruction. The acceptance instruction may also have a different duration to the mute instruction, or be formed by repeating the mute instruction within a predetermined period, e.g. using single and double pulses.

The mute instruction may mute the remaining active transponders by halting the random wait cycle of the transponders until either restarted or reset by another instruction. If the random wait cycles of the remaining active transponders are halted by the mute instruction, the acceptance instruction may also instruct the remaining active transponders in the reader field to restart the existing random wait cycles. Alternatively, the acceptance instruction may cause the remaining active transponders to begin new random wait cycles.

The mute instruction may simply mute a transponder by inhibiting the said transponder from transmitting. Any transponder which reaches the end of its random wait cycle is inhibited from transmitting the transponder signal. For example, the mute instruction may set a flag and when a transponder reaches the end of its random wait cycle it checks to see whether the flag is set before transmitting. The transponder inhibit may be reset by the acceptance signal or be reset after a predetermined time.

The acceptance instruction may also act as a disabling instruction, disabling the transponder which has just transmitted either permanently, for a predetermined period of time or until it is reset. Thus a single acceptance instruction may be used to disable a transponder which has been successfully identified, and to instruct the remaining muted tags to continue with the existing, or begin new, random wait cycles.

The transponders may, instead of being reactivated by an acceptance instruction to the controlling transponder, remain muted for a predetermined period of time. The transponders random wait cycle may include a delay equal to the length of a transponder signal; if a disabling instruction is used then the delay may also include the period for the reader to transmit the disabling instruction.

If transponders with local timing means (as described in detail in EP 585,132 A mentioned above) are employed, the acceptance instruction, if used, may be synchronised with the particular timing means of the controlling transponder.

The frequency and duration (i.e. the timing) of the interrogator instructions may be preset in the interrogator at manufacture or installation. The timing may be set in an optimisation phase, e.g. after installation or the timing may be optimised in an initial interrogation and used in subsequent interrogations.

If the transponders within the interrogation field are programmed with unique codes, the acceptance instruction may be eliminated altogether, and the transponders may thereby provide for the continued surveillance of the articles to which the transponders are attached. If all the transponders are programmed with the same code and the disabling instruction is used, the number of transponders within the interrogation field may be counted. The transponders may be used as a "presence tags", indicating the number of articles to which the transponders are attached, and the response code may therefore be very simple. Selective use of the acceptance signal may provide more flexibility to an identification system.

Transponders and interrogators, such as those described in EP 494,114 A and EP 585,132A may be adapted to produce transponders and interrogators according to the invention.

The invention will now be described in further detail. Specific non-limiting embodiments are hereinafter described with reference to the accompanying drawings, in which.

Figure 1:
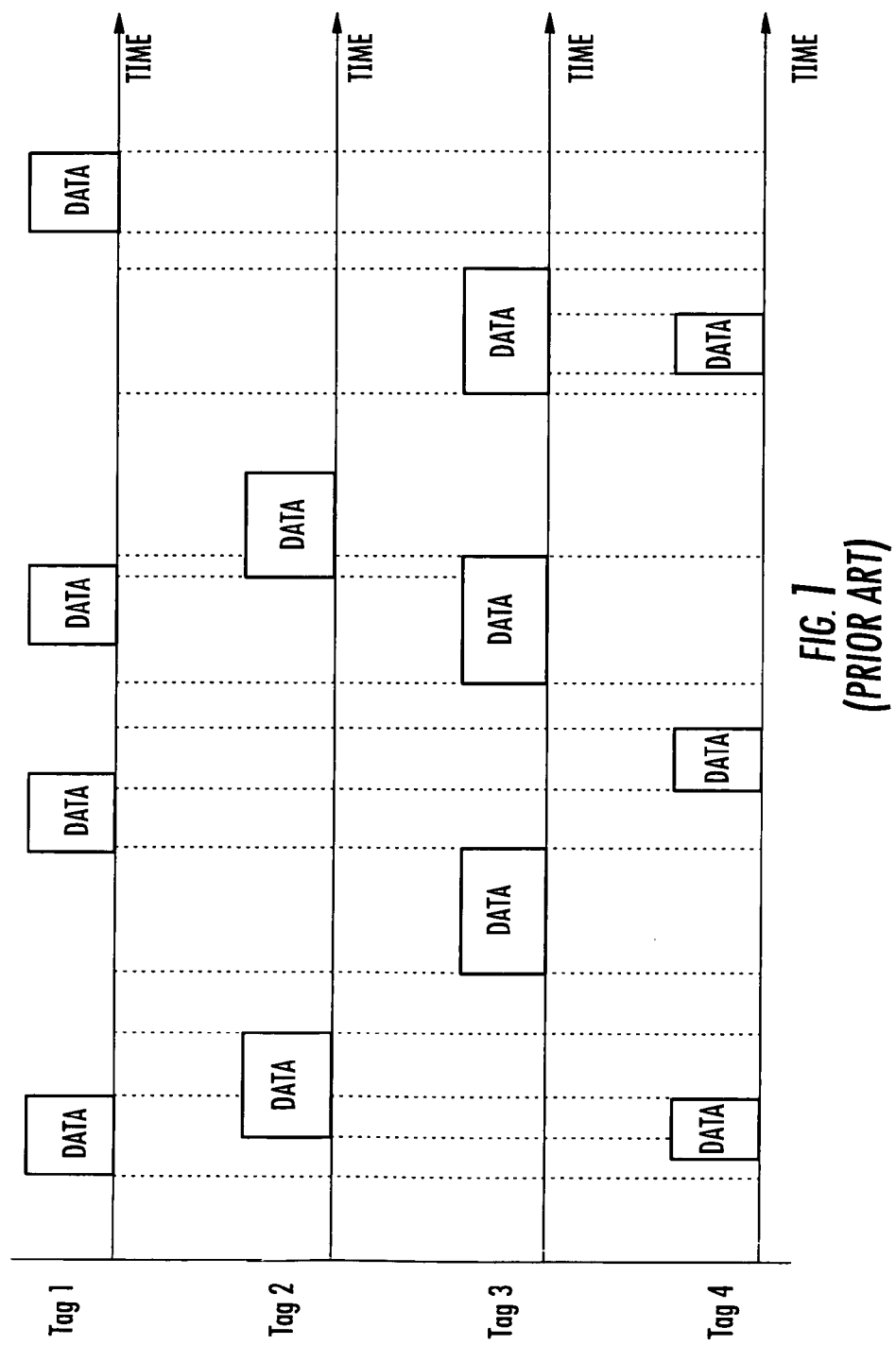
FIG. 1 is a simplified representation of prior art transponder data transmissions.
Figure 2:
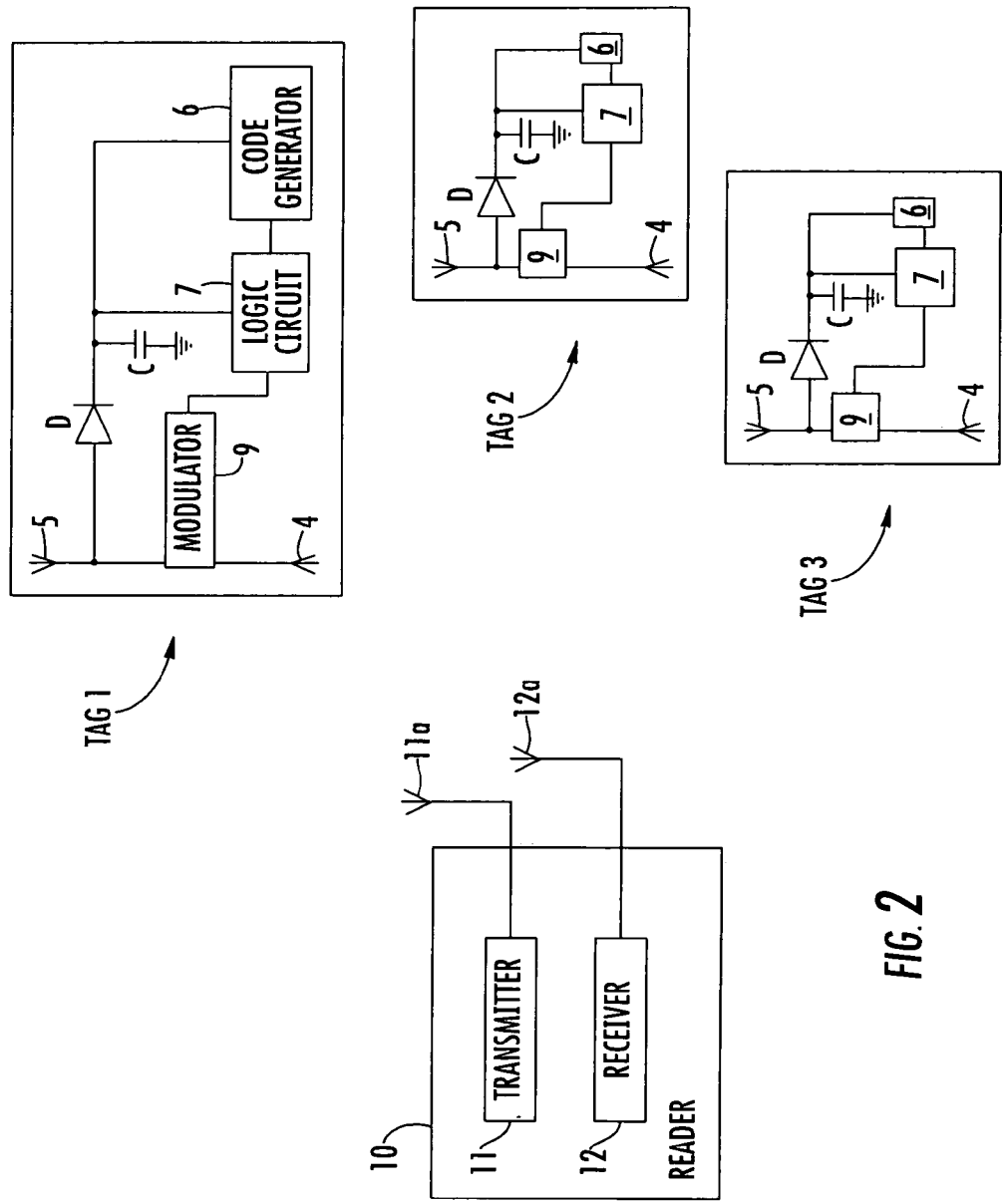
FIG. 2 is a simplified block diagram showing an interrogator and three transponders according to a first embodiment of the invention.

FIG. 2 shows an example of the RFID system comprising a reader 10, including a transmitter 11 with a transmitting antenna 11a and a receiver 12 with a receiving antenna 12a. The transmitter (11, 11a) transmits a powering signal (the reader signal) to a number of passive transponders (tag 1, tag 2 and tag 3).

Each transponder includes a dipole antenna, the two poles of which are indicated by 4 and 5. The transponders within the reader field are able to derive a power supply from the energy in the reader signal using the capacitor C and the diode D. The code generator 6 and logic circuit 7 generate a signal using Manchester coding, which is transmitted to the reader, by modulating a portion of the energy received from the reader using the modulator 9 connected between the antenna poles 4 and 5. The transponders have local timing means (as described in detail in EP 585,132 A mentioned above).

On receiving power each transponder executes a random wait cycle before transmitting a signal. If a signal is received the reader issues a mute instruction. The mute instruction may consist of a short gap (a partial or complete interruption) in or other modification of the signal. All other active transponders within the reader field are temporarily muted by the broadcast of the mute instruction, which is recognised as giving control to another transponder. The reader issues an acceptance instruction (disable/wakeup instruction) once the transponder signal has been received free from noise or interference. Since the transponders have local timing means (as described in detail in EP 585,132 A mentioned above) the timing and the duration of this instruction is synchronised with the local timing means. The random wait cycles of these transponders are reactivated by this disable/wakeup instruction.

Figure 3:
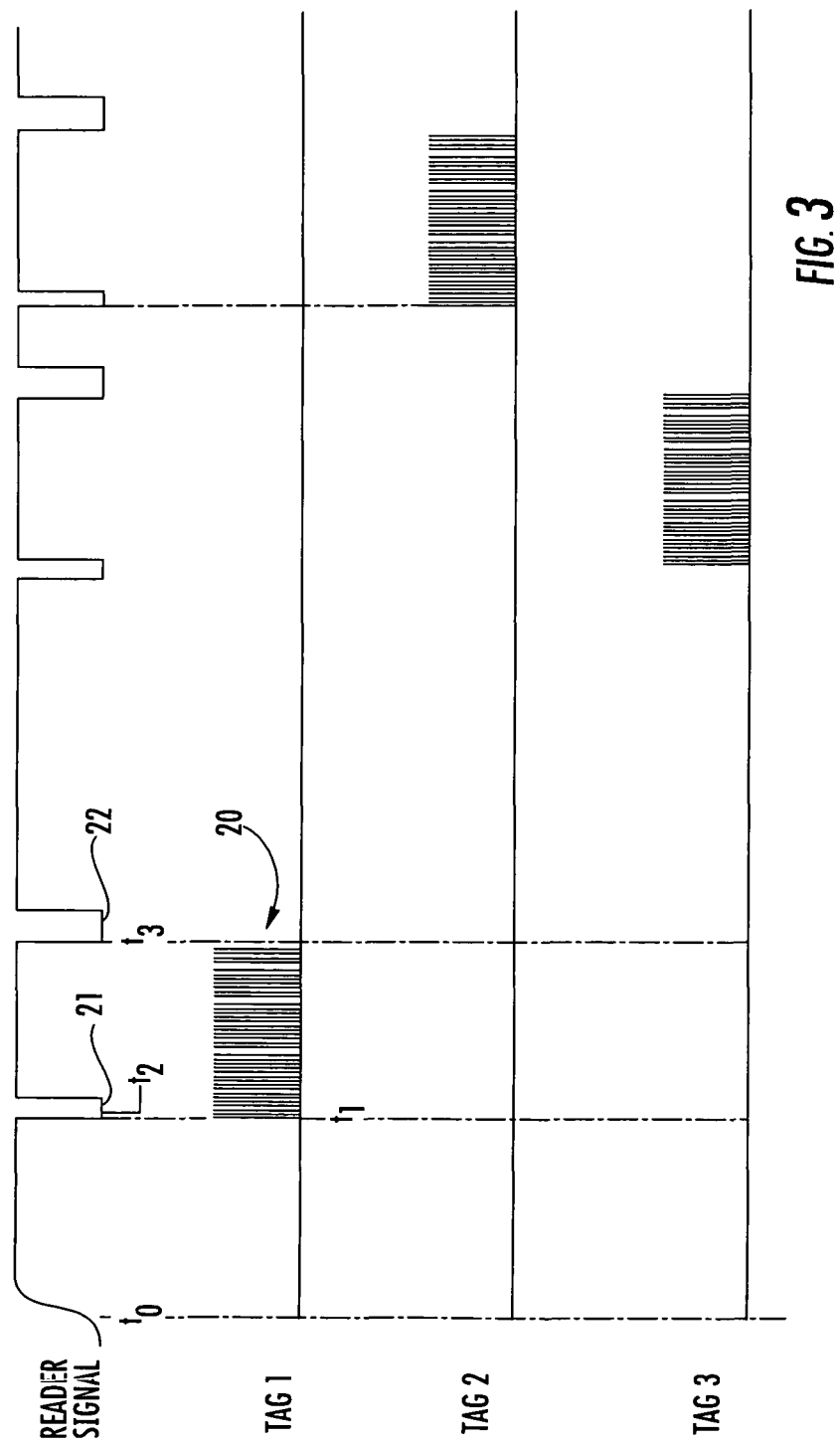
FIG. 3 is a simplified representation of an interrogator and a number of transponders.

FIG. 3 represents the reader signal and the replies from the transponders. The reader signal 20 is powered up a time to, whereupon the transponders within the reader field are powered and begin random wait cycles. In the example shown in FIG. 3, tag 1 transmits a signal at time t The reader recognises a transponder signal and, by interrupting the reader signal at time t2, makes mute instruction 21 which halts the random wait cycles of tags 2 and 3. When tag 1 has completed transmitting the signal 20 the reader issues an instruction 22 at time t3.

In the example shown in FIG. 3, tags 2 and 3 are temporarily muted by the broadcast of the mute instruction 21 at time t3. Tags 2 and 3 are instructed to resume the random wait cycle by the broadcast of the disable/wakeup instruction 22, which also disables tag 1 until it is removed from the field. In this figure, the read process is then successfully completed for tag 3 followed by tag 2.

Figure 4:
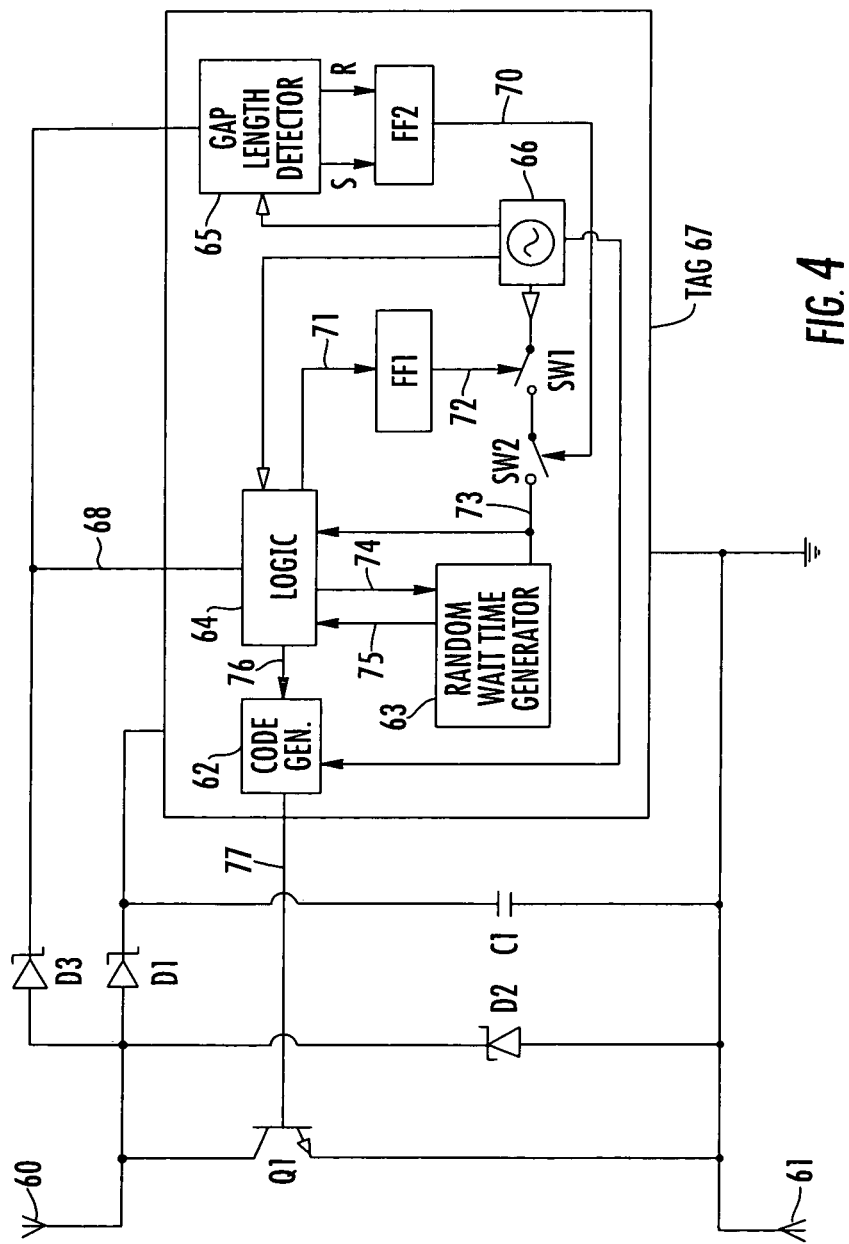
FIG. 4 is a block diagram of a transponder according to the first embodiment of the invention.
Figure 5:
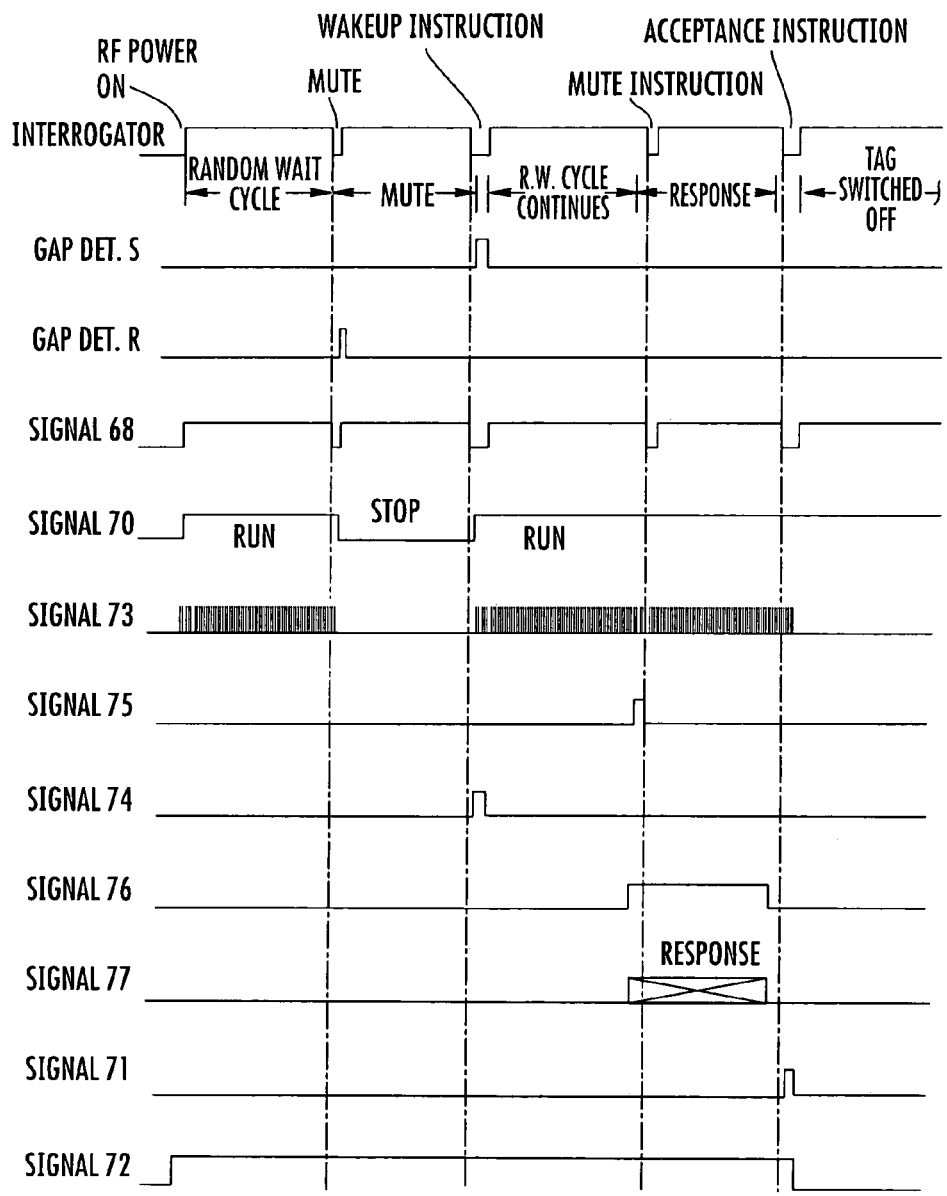
FIG. 5 shows a timing diagram of a transponder according to the first embodiment of the invention.

FIG. 4 shows, in outline, tag 67 which may be used with the reader of FIG. 2 and FIG. 5 shows a timing diagram for the signal paths marked in FIG. 4. The tag 67 includes a dipole antenna, the poles of which are shown as 60 and 61. A code generator 62, when enabled by a logic circuit 64 modulates a transistor Q1 with a code, using Manchester coding (signal 77). The timing for the code generator is derived from a local oscillator 66. Diodes D1 and D2 in combination with a capacitor C1 supply the power for tag 67. The oscillator is disconnected from the random wait time generator when either FF1 or FF2 is in the reset state (signals 70 and 72). FF1 is set only when the tag 67 is powered up and resets when the tag 67 is switched off after being read successfully. FF2 is in the reset state when the tag 67 is muted and in the set state on power up and when the tag 67 is in its normal operating mode. When the tag 67 initially receives the reader signal FF1 will be in the set state. On power up the logic circuit 64 triggers the random wait timer 63 to select a random value and begin a countdown.

The gap detector circuit 65 is able to detect the presence or absence of the reader signal by means of diode D3 and, if there is an interruption or gap in the reader signal, the duration of the gap. The gap detector circuit is shown in more detail in FIG. 7.

A long gap (a disable/wakeup instruction) will set FF2 and a short gap (mute instruction) will reset FF2. Therefore a disable/wakeup gap from the reader is detected by the gap detector which sets FF2, which enables the random wait time generator to run. The random wait time generator indicates (signal 75) the end of the countdown to the logic circuit 64 which then enables (signal 76) the code generator 62 to modulate transistor Q1 with the code. The logic circuit also inhibits the gap detector circuit for the time tag 67 takes to transmit the signal. If, during the countdown a mute gap from the reader is received (passing control to another transponder) the gap detector switches FF2 into the reset state, thereby disconnecting the oscillator (signal 73) and pausing the countdown. FF2 remains in the reset state until another pulse from the reader is received (the disable/wakeup gap which disables the controlling transponder). The random wait timer then continues the countdown until either the transponder signal is transmitted or another mute gap is received.

If the reader issues an appropriately timed disable/wakeup gap once the transponder signal has been received by the reader free from noise or other interference. The gap detector circuit detects this gap and indicates the presence of this gap to logic circuit 64. Provided that this gap occurs at a predetermined time after the end of the transponder signal, e.g. 5 clock pulse after the end of the code, logic circuit 64 (signal 71) will reset FF1. FF1 (signal 72) disconnects the oscillator until it is reset, in this case after removing the tag 67 from the field and allowing capacitor C1 to discharge sufficiently.

If it is not necessary for the tags to be switched off after successful detection of the transponder signal, flip-flop FF1 and switch SW1 may be omitted entirely from the tag 67.

Figure 6:
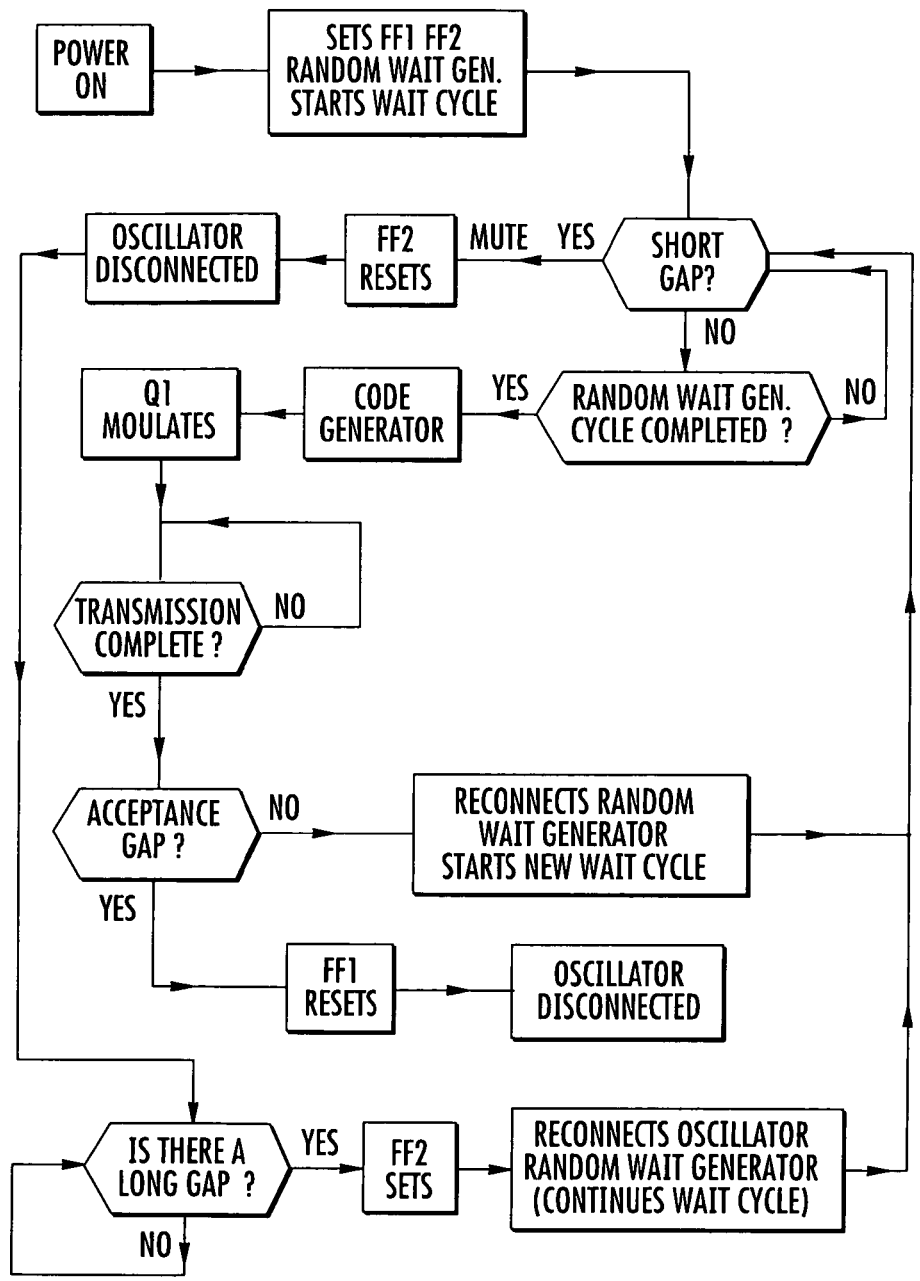
FIG. 6 shows a flow diagram for a transponder according to the first embodiment of the invention.

FIG. 6 shows a flow diagram for the operation of the tag 67 illustrated in FIG. 4.

Figure 7:
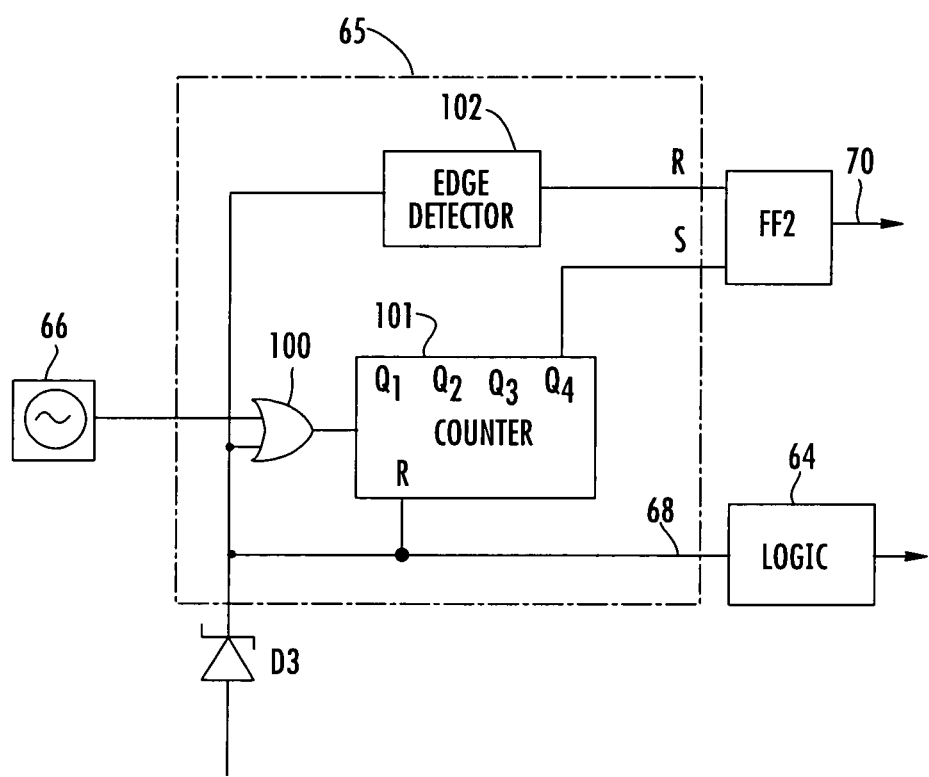
FIG. 7 shows a detailed diagram of a gap detector circuit according to the first embodiment of the invention.

The gap detector circuit 65 is shown in more detail in FIG. 7. When a gap appears in the interrogation (a mute gap), the output of D3 goes low. The edge detector circuit 102 detects a falling edge on the output of D3, which in turn resets FF2. The output of OR gate 100 then passes pulses from the oscillator 66 to the counter 101. When the counter reaches a value sufficient to make output Q4 go high, FF2 is set. When the output of D3 returns to high (the end of the mute gap) the counter is reset. If the gap is short, counter 101 is rest before Q4 would have gone high. FF2 gets reset at the beginning of the gap and remains in this condition after the gap. If the gap is long, FF2 is still reset at the beginning of the gap. When counter 101 has counted up sufficiently for Q4 to go high, FF2 is set and it remains in this set state after the gap.

Figure 8:
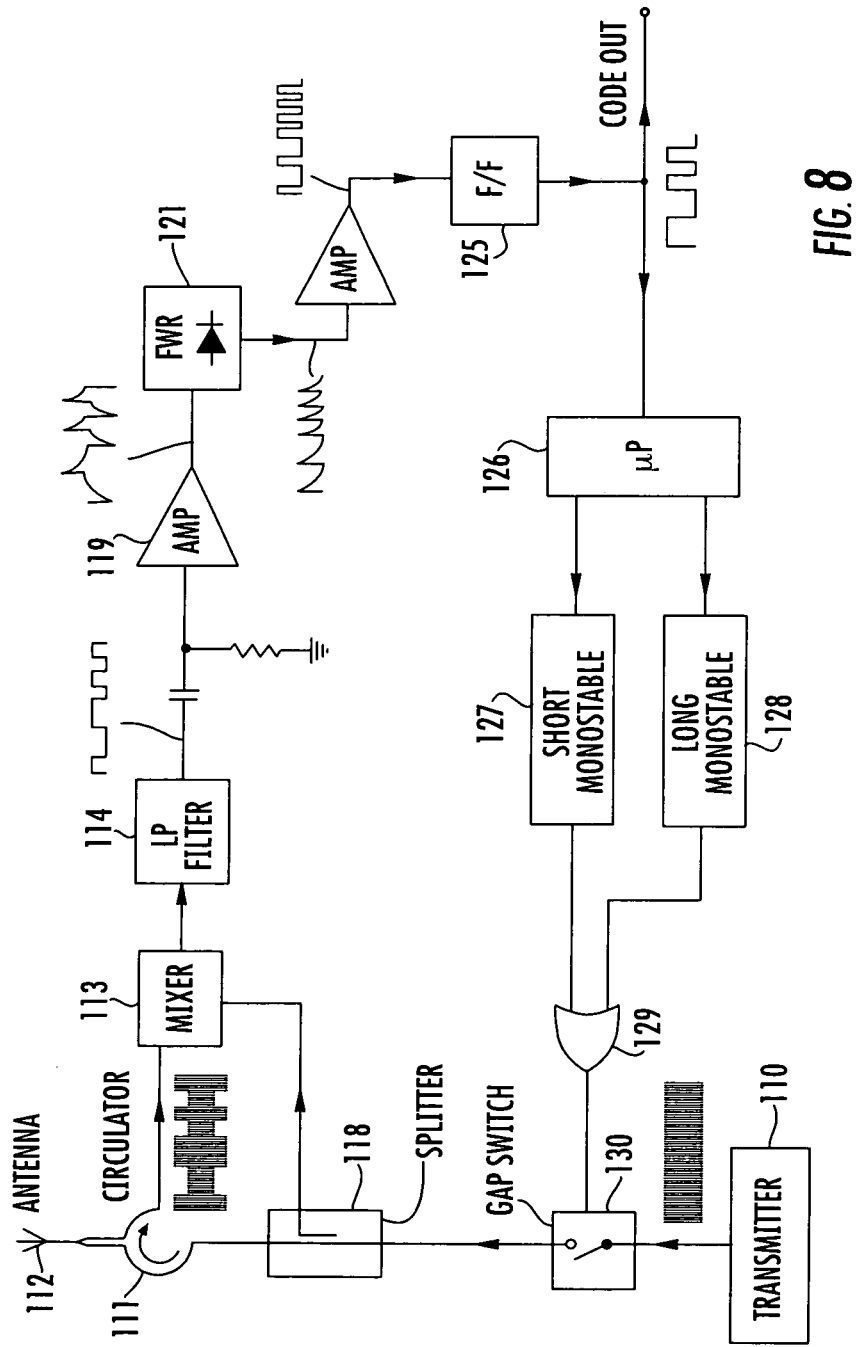
FIG. 8 shows the circuit for the interrogator of the first embodiment of the invention.

FIG. 8 shows the circuit for the interrogator. The transmitter 110 produces a reader rf continuous wave signal which is transmitted to the tags via the circulator 111 and the antenna 112. The tag signal is received by the antenna 112 and passed via the circulator 111, to separate it from the transmitter signal, to the mixer 113, which extracts the low frequency code signal, and to the low pass filter 114. The mixers 113 mixes the tag's signal with a portion of the transmitted reader signal extracted by splitter 118 thereby generating the baseband signal which is fed to filter 114. The outputs of the filter is then amplified 119 and full wave rectified 121. The resulting signal is then amplified and passed, via a divide by two circuit 125 to the microprocessor 126. The microprocessor may interrupt the reader signal with either a short or a long gap, using either the short monostable 127 or the long monostable 128, the AND gate 129 and switch 130.

Figure 9:
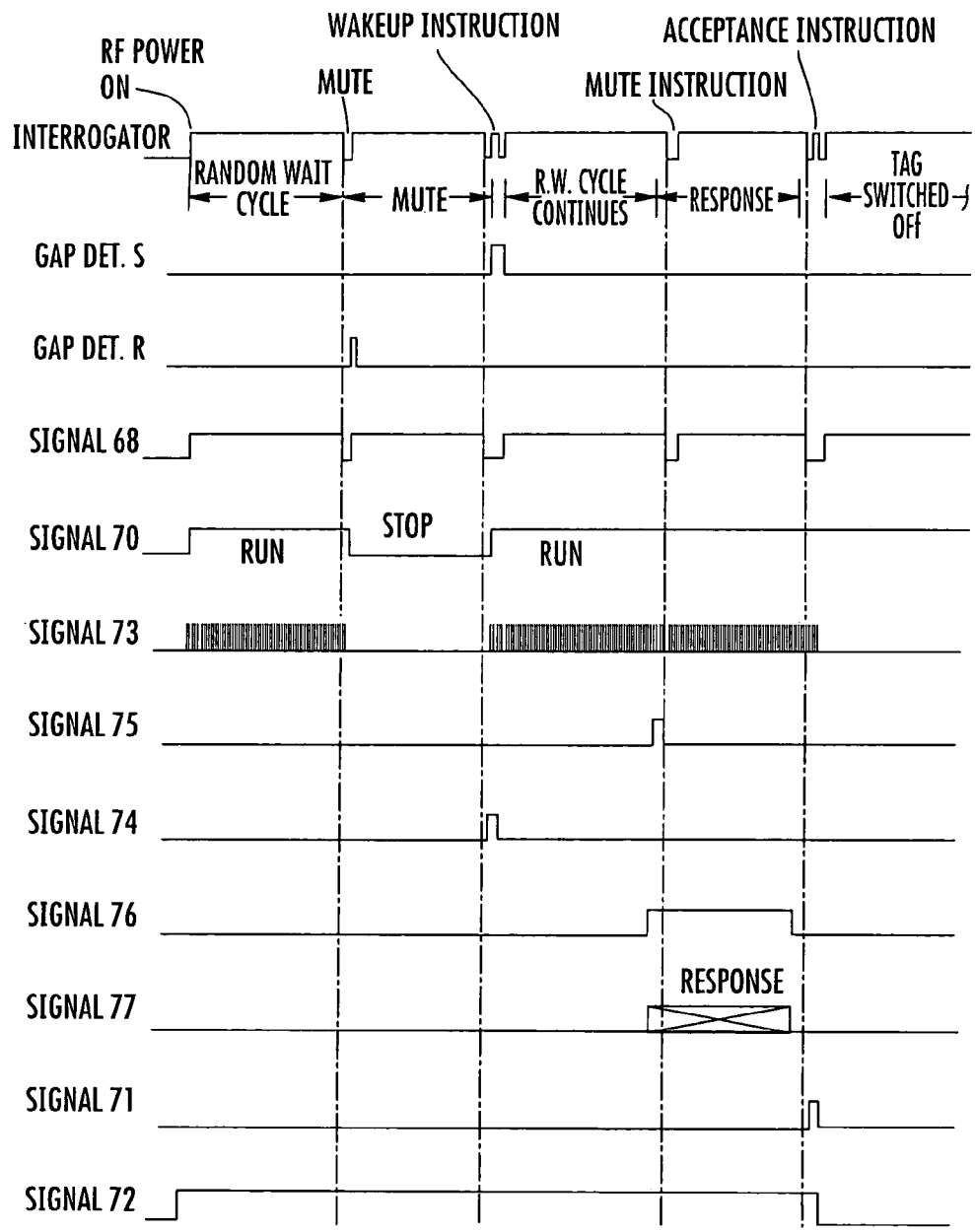
FIG. 9 shows a timing diagram of a transponder according to a second embodiment of the invention.

Referring to FIG. 9 in a second embodiment of the invention the interrogator is adapted to provide a double pulse wakeup or acceptance instruction and single pulse for the mute instruction. The transponder is adapted to distinguish between the signals. In particular, in the transponder the gap detector details circuit 68 is adapted to sense for the occurrence of 1 or 2 "short" pulses of the same duration and to provide the Set 5 signal to FF2 on occurrence of 2 pulses and the Reset R signal to FF2 on occurrence of 1 pulse.

It will be immediately appreciated by those skilled in the art the functionality of the tags and reader may be achieved in a number of different ways. For example, the tags, instead of deriving power from the reader signal, may be powered by a small battery.

In a further embodiment the integrated circuit of the transponder has read/write capabilities. Instructions sent from the reader to the transponder may take the form of coded instructions included in the mute and/or acceptance instructions. For example, if the mute and/or acceptance instructions are in the form of interruptions in the reader signal, the coded instructions may be present in the gaps in the reader signal defined by those interruptions.

In the embodiments above the reader, on recognising the transponder signal from a transponder, immediately issues a mute instruction, muting all other active transponders, and passing control to the transponder. Preferably the mute instruction is transmitted as soon as the reader recognises, or there is a high probability that the reader has recognised, a valid signal from the transponder. In one embodiment the first few pulses in the signal from the transponder may have a unique shape or characteristic thereby enabling the reader to distinguish quickly whether or not the signal received is from the transponder as opposed to being the product of spurious noise.

The invention claimed is:

1. A system comprising:
a reader; and
a plurality of transponders;
wherein the reader is configured to transmit a powering signal to the plurality of transponders,
wherein each of the transponders is configured to transmit identifying data subsequent to receiving the power signal, wherein each of the transponders is configured to transmit the identifying data in response to the powering signal without a need for an instruction in the powering signal,
wherein the reader is further configured to transmit a mute instruction muting all transponders except for a controlling transponder,
wherein a coded instruction is included in the mute instruction,
wherein the controlling transponder is configured to perform an operation in accordance with the coded instruction, and
wherein the mute instruction comprises a modulation of the powering signal while the powering signal maintains a pre-selected frequency.

2. A transponder comprising circuitry configured to:
receive a powering signal from a reader;
transmit identifying data subsequent to receiving the powering signal, wherein the circuitry is configured to transmit the identifying data in response to the powering signal without a need for an instruction in the powering signal;
receive a mute instruction;
recognize a coded instruction included in the mute instruction and perform an operation in accordance with the coded instruction when the transponder is a controlling transponder, and when the transponder is not the controlling transponder mute transmissions by the transponder; and
wherein the mute instruction comprises a modulation of the powering signal while the powering signal maintains a pre-selected frequency.

3. A reader comprising circuitry configured to:
transmit a powering signal to a plurality of transponders; and
in response to receiving a transponder transmission including data identifying a controlling transponder, transmit a mute instruction thereby muting all transponders except for a controlling transponder;
wherein the circuitry is configured to transmit the powering signal to cause the transponder transmission without a need for an instruction in the powering signal;

wherein the mute instruction includes a coded instruction directing the controlling transponder to perform an operation; and wherein the mute instruction comprises a modulation of the powering signal while the powering signal maintains a pre-selected frequency.

4. A system comprising:

a reader; and a plurality of transponders;

wherein the reader is configured to transmit a powering signal to the plurality of transponders, wherein each of the transponders is configured to transmit identifying data subsequent to receiving the power signal, wherein the reader is further configured to transmit a mute instruction muting all transponders except for a controlling transponder, wherein the reader is configured to transmit an acceptance instruction subsequent to receiving identifying data from the controlling transponder, wherein a coded instruction is included in the mute instruction, wherein the controlling transponder is configured to perform an operation in accordance with the coded instruction, and wherein the mute instruction comprises a modulation of the powering signal while the powering signal maintains a pre-selected frequency.

5. A transponder comprising circuitry configured to:

receive a powering signal from a reader;

transmit identifying data subsequent to receiving the powering signal;

receive a mute instruction;

recognize a coded instruction included in the mute instruction and perform an operation in accordance with the coded instruction when the transponder is a controlling transponder, and wherein the transponder is not the controlling transponder mute transmissions by the transponder; and receive an acceptance instruction from the reader subsequent to transmitting the identifying data in an instance in which the transponder is the controlling transponder, wherein the mute instruction comprises a modulation of the powering signal while the powering signal maintains a pre-selected frequency.

6. A reader comprising circuitry configured to:

transmit a powering signal to a plurality of transponders;

in response to receiving a transponder transmission including data identifying a controlling transponder, transmit a mute instruction thereby muting all transponders except for a controlling transponder;

transmit an acceptance instructions subsequent to receiving the transponder transmission from the controlling transponder, wherein the mute instruction includes a coded instruction directing the controlling transponder to perform an operation, and wherein the mute instruction comprises a modulation of the powering signal while the powering signal maintains a pre-selected frequency.

* * * * *